United States Patent
Smiddy et al.

(10) Patent No.: US 12,467,629 B1
(45) Date of Patent: Nov. 11, 2025

(54) CMC COMPONENT WITH COVER PLATE

(71) Applicant: RTX CORPORATION, Farmington, CT (US)

(72) Inventors: Winston Smiddy, South Windsor, CT (US); Peter Wilkins, Manchester, CT (US); Alex J. Schneider, Manchester, CT (US); Paul M. Lutjen, Kennebunkport, ME (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 19/023,061

(22) Filed: Jan. 15, 2025

(51) Int. Cl.
- *F23R 3/00* (2006.01)
- *F01D 11/08* (2006.01)
- *F01D 25/12* (2006.01)
- *F02C 7/12* (2006.01)

(52) U.S. Cl.
CPC .............. *F23R 3/007* (2013.01); *F01D 11/08* (2013.01); *F01D 25/12* (2013.01); *F02C 7/12* (2013.01); *F05D 2300/6033* (2013.01); *F23R 3/002* (2013.01); *F23R 2900/00018* (2013.01)

(58) Field of Classification Search
CPC ...................... F23R 3/002; F23R 3/007; F23R 2900/00018; F02C 7/12; F01D 11/08; F01D 11/24; F01D 25/005; F01D 25/12; F01D 25/246; F01D 9/04; F01D 9/041; F01D 9/042; F05D 2300/5021; F05D 2300/50212; F05D 2300/6033; F05D 2300/6034; F05D 2240/11; F05D 2250/182; F05D 2260/22141

See application file for complete search history.

(56) References Cited

U.S. PATENT DOCUMENTS

| | | | | |
|---|---|---|---|---|
| 4,337,016 A | * | 6/1982 | Chaplin | F01D 11/24 415/128 |
| 4,573,865 A | * | 3/1986 | Hsia | F01P 1/00 415/173.1 |
| 5,584,651 A | * | 12/1996 | Pietraszkiewicz | F01D 25/12 415/173.1 |
| 6,779,597 B2 | * | 8/2004 | DeMarche | F01D 11/24 165/169 |
| 8,061,979 B1 | * | 11/2011 | Liang | F01D 11/08 415/173.1 |
| 8,118,546 B2 | | 2/2012 | Morrison | |
| 8,128,344 B2 | * | 3/2012 | McGovern | F01D 11/08 415/176 |
| 8,439,629 B2 | * | 5/2013 | Pietraszkiewicz | F02C 7/18 415/173.1 |
| 8,439,636 B1 | * | 5/2013 | Liang | F01D 11/08 415/173.1 |
| 8,475,121 B1 | * | 7/2013 | Liang | F01D 11/08 415/173.1 |

(Continued)

*Primary Examiner* — William H Rodriguez
(74) *Attorney, Agent, or Firm* — Millen, White, Zelano & Branigan, P.C; Brion P. Heaney

(57) ABSTRACT

The disclosure describes methods and devices for directing/controlling cooling air flow for cooling CMC components. A cover plate is positioned within a cooling cavity in the CMC component wherein the cover plate is angled to vary the depth of the cooling cavity between the cover plate and a bottom wall of the cavity. The angled cooling plate can be used to vary the flux of cooling air within the cooling cavity and thereby achieve a desired cooling performance within the cooling cavity.

20 Claims, 5 Drawing Sheets

(56) References Cited

U.S. PATENT DOCUMENTS

| | | | |
|---|---|---|---|
| 8,727,704 B2* | 5/2014 | Lee | F01D 11/08 415/173.1 |
| 9,103,225 B2* | 8/2015 | Lutjen | F01D 11/08 |
| 10,570,772 B2 | 2/2020 | Smith et al. | |
| 2006/0140753 A1* | 6/2006 | Romanov | F01D 25/12 415/173.1 |
| 2008/0211192 A1* | 9/2008 | Pietraszkiewicz | F01D 11/08 277/347 |
| 2009/0067994 A1* | 3/2009 | Pietraszkiewicz | F01D 25/246 415/173.1 |
| 2009/0169368 A1* | 7/2009 | Schlichting | F01D 11/122 415/173.1 |
| 2010/0232929 A1* | 9/2010 | Joe | F01D 9/04 415/1 |
| 2013/0323033 A1* | 12/2013 | Lutjen | F01D 1/02 415/173.1 |
| 2016/0003080 A1* | 1/2016 | Mcgarrah | F01D 11/08 415/173.1 |
| 2016/0194980 A1* | 7/2016 | Thomen | F02C 7/12 415/115 |
| 2016/0319841 A1* | 11/2016 | McCaffrey | F01D 25/12 |
| 2016/0332229 A1* | 11/2016 | Snyder | B22F 10/385 |
| 2017/0044931 A1* | 2/2017 | Lutjen | F01D 25/12 |
| 2018/0031238 A1* | 2/2018 | Harding | F23R 3/04 |
| 2020/0025026 A1* | 1/2020 | Packer | F01D 11/08 |
| 2020/0040751 A1* | 2/2020 | Barker | F01D 11/005 |
| 2020/0040756 A1* | 2/2020 | Clark | F01D 11/08 |
| 2020/0072084 A1* | 3/2020 | Blaney | F01D 25/246 |
| 2020/0149477 A1* | 5/2020 | Barker | F02C 7/28 |
| 2020/0173299 A1* | 6/2020 | Barker | F01D 11/125 |
| 2020/0300108 A1* | 9/2020 | Barker | F01D 25/246 |
| 2021/0071541 A1* | 3/2021 | Thirumalai | F16J 15/0887 |
| 2021/0246829 A1* | 8/2021 | Gregg | F01D 25/12 |

* cited by examiner

US 12,467,629 B1

CMC COMPONENT WITH COVER PLATE

FIELD OF THE INVENTION

The present disclosure relates generally to methods for manufacturing ceramic matrix composites (CMCs). In particular, the present disclosure concerns manufacturing CMC components with structures to facilitate cooling and directing/controlling the flow of cooling air.

BACKGROUND OF THE INVENTION

Gas turbine engines, in general, include a fan section, a compressor section, a combustion section, and a turbine section. Air enters through the fan section and is compressed in the compressor section before being introduced into the combustion section. In the combustion section, the air is mixed with fuel and ignited to generate a high-energy, high temperature gas flow. The high-energy, high temperature gas flow is expanded in the turbine section which is used to create thrust and to drive the compressor and fan sections.

Certain components of gas turbine engines are thus exposed to the high-energy, high temperature gas flow (flow path components). Therefore, it is desirable that such flow path components be made of heat-resistant materials, for example, superalloys and ceramic matrix composites (CMCs). While these materials are heat resistant, the operational lifespan of such turbine engine components can be increased by including structures to permit the flow of cooling fluid (e.g., cooling air) to interact with and cool the component.

While CMC materials can withstand much higher operating temperatures than components composed of superalloys, CMCs have comparably lower thermal conductivity than superalloys. Thus, it is particularly desirable to take steps to efficiently cool CMC components using available cooling air flows.

CMC components can be provided with cooling cavities to allow cooling air to penetrate into the base of the CMC component and provide cooling of the interior thereof. Controlling flow within the cooling cavities can increase the efficiency of the cooling process.

There is thus a continuing need for providing alternative and/or improved cooling structures and methods for manufacturing such cooling structures in CMC components that allow for efficient and effective cooling of CMC components exposed to high temperature gas flow.

SUMMARY OF THE INVENTION

In general, the present disclosure relates to methods and devices for directing cooling air in conjunction with cooling CMC components, particularly structures used for directing/controlling cooling air flow within cooling cavities of CMC components such as blade outer air seals (BOAS).

The present disclosure is directed, in a first aspect, to a ceramic matrix composite (CMC) component comprising:
  a base having a radial outer surface and a radial inner surface inward surface, the base comprising a plurality of ceramic fiber plies and a ceramic matrix, the radial outer surface having a convex shape, and
  at least one cooling cavity within the base that extends from the outer radial surface of the base into an interior region of the base, the at least one cooling cavity having a cavity opening at the outer radial surface of the base, and the at least one cooling cavity being defined by cavity side walls and a cavity bottom wall, and
  a cover plate positioned within the at least one cooling cavity to cover the cavity opening, wherein the cover plate is angled to vary the depth of the cooling cavity between the cover plate and the cavity bottom wall so that the depth varies from a cavity region of greater depth to a cavity region of lesser depth.

The present disclosure is also directed, in a further aspect, to a method of controlling cooling air flow within a CMC component, the method comprising:
  providing a CMC component comprising:
  a base having a radial outer surface and a radial inner surface inward surface, the base comprising a plurality of ceramic fiber plies and a ceramic matrix, the radial outer surface having a convex shape, and
  at least one cooling cavity within the base that extends from the outer radial surface of the base into an interior region of the base, the at least one cooling cavity having a cavity opening at the outer radial surface of the base, and the at least one cooling cavity being defined by cavity side walls and a cavity bottom wall, and
  positioning a cover plate within the at least one cooling cavity to cover the cavity opening, wherein the cover plate is angled to vary the depth of the cooling cavity between the cover plate and the cavity bottom wall so that the depth varies from a cavity region of greater depth to a cavity region of lesser depth.

The present disclosure is further directed, in an additional aspect, to a turbine engine comprising:
  a fan section, a compressor section, a combustion chamber, and a turbine section, the turbine section including at least one rotor and one or more turbine blade(s) extending radially outwardly from the at least one rotor; and
  a blade outer air seal assembly positioned between the one or more turbine blade(s) and an outer casing to the engine;
  wherein the blade outer air seal assembly is formed of a plurality blade outer air seal segments, wherein each blade outer air seal segment comprises:
  a base having a radial outer surface and a radial inner surface inward surface, the base comprising a plurality of ceramic fiber plies and a ceramic matrix, the radial outer surface having a convex shape,
  at least one cooling cavity within the base that extends from the outer radial surface of the base into an interior region of the base, the at least one cooling cavity having a cavity opening at the outer radial surface of the base, and the at least one cooling cavity being defined by cavity side walls and a cavity bottom wall, and
  a cover plate positioned within the at least one cooling cavity to cover the cavity opening, wherein the cover plate is angled to vary the depth of the cooling cavity between the cover plate and the cavity bottom wall so that the depth varies from a cavity region of greater depth to a cavity region of lesser depth.

In further embodiments of the present disclosure, including further embodiments of the above exemplary embodiments, the base is made of a SiC/SiC composite.

In further embodiments of the present disclosure, including further embodiments of the above exemplary embodiments, the component has two of the cooling cavities within the base, wherein each of the cavity openings is covered by a cover plate, and each cover plate is angled to vary the depth of the cooling cavity between the cover plate and the cavity bottom wall.

In further embodiments of the present disclosure, including further embodiments of the above exemplary embodiments, the cover plate has at least one cooling air inlet and the base further includes at least one cooling air outlet channel that provides fluid communication between the interior of the at least cooling cavity beneath the cover plate and the exterior of the CMC component.

In further embodiments of the present disclosure, including further embodiments of the above exemplary embodiments, the at least one cooling air inlet is in fluid communication with the cavity region of greater depth and the at least one cooling air outlet channel is in fluid communication with the cavity region of lesser depth.

In further embodiments of the present disclosure, including further embodiments of the above exemplary embodiments, the at least one cooling air inlet is in fluid communication with the cavity region of lesser depth and the at least one cooling air outlet channel is in fluid communication with the cavity region of greater depth.

In further embodiments of the present disclosure, including further embodiments of the above exemplary embodiments, the cover plate is angled such that at a first edge of the cover plate the depth between the cover plate and the cavity bottom wall is 1.5 to 5 times greater than the depth between the cover plate and the cavity bottom wall at a second edge of the plate.

In further embodiments of the present disclosure, including further embodiments of the above exemplary embodiments, the base has a forward edge, an aft edge, a first side edge and a second side edge, the forward edge and aft edge being spaced from one another in an axial direction, the first side edge and a second side edge being spaced from one another in a circumferential direction, and wherein the depth between the cover plate and the cavity bottom wall varies in a circumferential direction.

In further embodiments of the present disclosure, including further embodiments of the above exemplary embodiments, the base has a forward edge, an aft edge, a first side edge and a second side edge, the forward edge and aft edge being spaced from one another in an axial direction, the first side edge and a second side edge being spaced from one another in a circumferential direction, and wherein the depth between the cover plate and the cavity bottom wall varies in an axial direction.

In further embodiments of the present disclosure, including further embodiments of the above exemplary embodiments, the cover plate has edges that are positioned with the cavity side walls.

In further embodiments of the present disclosure, including further embodiments of the above exemplary embodiments, the component is a combustor liner.

In further embodiments of the present disclosure, including further embodiments of the above exemplary embodiments, the component is a blade outer air seal (BOAS) segment.

In further embodiments of the present disclosure, including further embodiments of the above exemplary embodiments, the component is a BOAS assembly comprising a plurality of BOAS segments arranged to form an annular shaped structure.

BRIEF DESCRIPTION OF FIGURES

The features of the disclosure believed to be novel and the elements characteristic of the invention are set forth with particularity in the appended claims. The figures are for illustration purposes only and are not drawn to scale. The disclosure itself, however, both as to organization and method of operation, can best be understood by reference to the description of the preferred embodiment(s) which follows, taken in conjunction with the accompanying drawings in which:

DETAILED DESCRIPTION OF THE INVENTION

Figure 1:
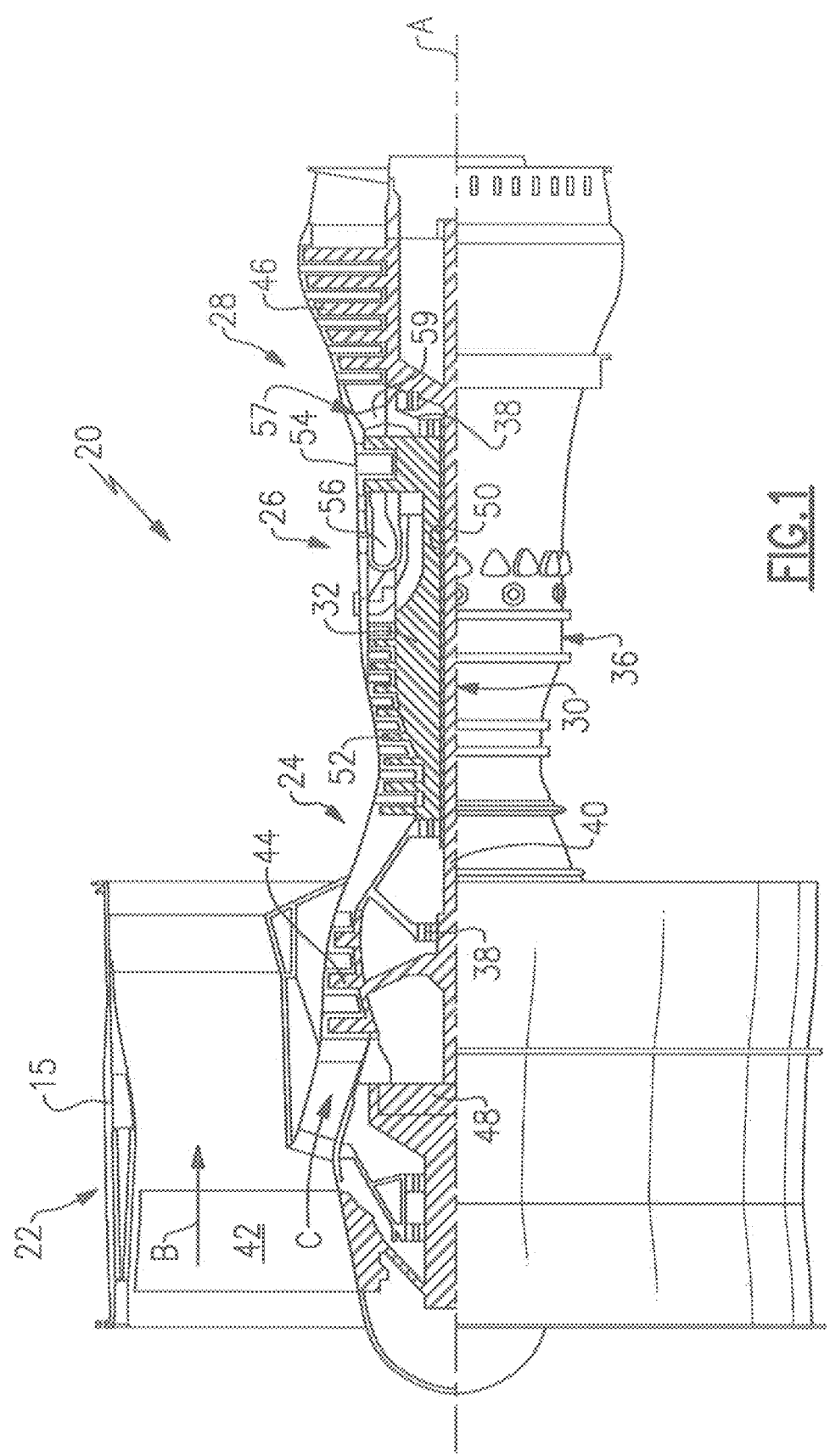
FIG. 1 schematically illustrates a partial cross section of an exemplary gas turbine engine.

The embodiments of the present disclosure can comprise, consist of, and consist essentially of the features and/or steps described herein, as well as any of the additional or optional ingredients, components, steps, or limitations described herein or would otherwise be appreciated by one of skill in the art. It is to be understood that all concentrations disclosed herein are by weight percent (wt. %.) based on a total weight of the composition unless otherwise indicated.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of the embodiments of the inventive concepts, numerous specific details are set forth in order to provide a more thorough understanding of the inventive concepts. It will be apparent to one skilled in the art, however, having the benefit of the instant disclosure that the inventive concepts disclosed herein may be practiced without these specific details.

While the discussion below often makes reference to BOAS and BOAS segments, it should be recognized that the present disclosure is not limited to BOAS but includes other CMC components used within jet engines that may be exposed to high temperature gas flows, for example, other seals, vane airfoils and platforms therefor, and combustor liners.

In the discussion below, axial refers to a direction that coincides with the longitudinal axis of the engine. Radial refers to a direction that is radial with respect to the longitudinal axis of the engine. Circumferential refers to a direction that corresponds to the circumference of a circle around the longitudinal axis of the engine. The leading edge/portion of a structure is the edge/portion that faces in the direction toward the flow of the hot gases, i.e., faces upstream. The trailing edge/portion of a structure is the edge/portion that the faces in the direction away from the flow of the hot gases, i.e., faces downstream.

FIG. 1 schematically illustrates an example of a gas turbine engine 20 (i.e., a two-spool turbofan) which includes a fan section 22, a compressor section 24, a combustor section 26, and a turbine section 28. Fan section 22 drives air along a bypass flow path B in a bypass duct defined within a housing 15, and also along a core flow path C for compression in compressor section 24, with subsequent introduction into combustor section 26, followed by expansion through turbine section 28. Although FIG. 1 depicts a two-spool turbofan gas turbine engine, it should be understood that the concepts described herein are not limited to use with two-spool turbofans engines and may be applied to other types of turbine engines.

Engine 20 generally includes a low speed spool 30 and a high speed spool 32 mounted for rotation about an engine central longitudinal axis A, relative to an engine static structure 36, via several bearing systems 38. Various bearing systems 38 at various locations may alternatively or additionally be provided. The location of bearing systems 38 may be varied as appropriate to the application.

The low speed spool 30 generally includes an inner shaft 40 that interconnects a first (or low) pressure compressor 44 and a first (or low) pressure turbine 46. Inner shaft 40 is connected to fan 42 through a speed change mechanism, which in this exemplary embodiment is illustrated as a geared structure 48 to drive fan 42 at a lower speed than the low speed spool 30. High speed spool 32 includes an outer shaft 50 that interconnects a second (or high) pressure compressor 52 and a second (or high) pressure turbine 54. Combustor 56 is positioned between high pressure compressor 52 and high-pressure turbine 54. A mid-turbine frame 57 of the engine static structure 36 may be arranged generally between the high-pressure turbine 54 and the low-pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core air flow is first compressed by low pressure compressor 44, and then by the high-pressure compressor 52. Thereafter, the core air flow is mixed and burned with fuel in combustor 56, then expanded in high pressure turbine 54 and low-pressure turbine 46. The mid-turbine frame 57 includes airfoils 59 which are in the core airflow path C. The turbines 46 and 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low-pressure compressor, or aft of the combustor section 26 or even aft of turbine section 28, and fan 42 may be positioned forward or aft of the location of gear system 48.

The turbine section 28 includes at least one rotor and at least one blade extending radially outwardly from the rotor. The turbine section 28 may further include a blade outer air seal(s) (BOAS(s)). The blade outer air seal can be an assembly of a plurality of BOAS segments that together form an annular shaped shroud around the engine's central longitudinal axis A which is positioned between an outer casing of the engine and the turbine blade(s) of the turbine section.

As noted above, jet engine components, such as BOAS, BOAS segments, other seals, vane airfoils and platforms therefor, blade airfoils and platforms therefor, and combustor liners, can be made from CMC materials. In general, these CMC components are prepared by first creating a CMC preform which serves as the initial framework for creating the CMC component. The preform contains a stack of fabric sheets or plies in which the stack is formed via a layup process. The plies are made from ceramic fibers, or bundles of ceramic fibers called tows, held together with a binder. The fiber tows can be in the form of unidirectional tows or can be woven fibers. For example, the fibers can be woven into a two-dimensional fabric sheet or ply and then the plies are stacked during the layup process to form the preform. Alternatively, the preform can be in the form of a three-dimensional weave wherein, for example, a plurality of warp fibers are interwoven through a plurality of weft fiber layers. Binders can be used to help hold the fibers/plies together to provide a certain rigidity to the preform, for example, polymeric binders such as polyvinyl alcohol (PVA) or polyvinyl butyral (PVB).

The fibers/filaments used in the CMC preforms may be, for example, silicon carbide (SiC), carbon, mullite, zirconium carbide (ZrC), hafnium carbide (HfC), silicon nitride, aluminum oxide, or combinations thereof. The ceramic fibers may also be oxycarbide-, oxynitride-, carbonitride-, silicate-, boride-, phosphide-, or oxide-based fibers. In still further examples, the fibers are fully crystalline, partially crystalline, or predominantly amorphous or glassy. In one particular example, the fibers are SiC fibers.

After the CMC preform is formed by the layup, the preform is subjected to densification to add matrix material to fill the remaining void spaces within the preform. This procedure stiffens and strengthens the fiber layers or woven plies of ceramic fiber tows to form the CMC. Thus, densification involves reducing the porosity within the preform, making it more solid and robust, by filing the remaining pores within the preform. The goal is to achieve a higher relative density, and ensure that the final CMC structure is compact and free of large voids. In one particular example, the CMC material contains SiC fibers within a SiC matrix, also referred to as a SiC/SiC composite.

Various methods can be used to add matrix material during densification. These include, but are not limited to, chemical vapor infiltration (CVI), melt infiltration (MI), for example, reactive melt infiltration (RMI) (such as liquid silicon infiltration (LSI)), and polymer infiltration and pyrolysis (PIP).

Figure 2:
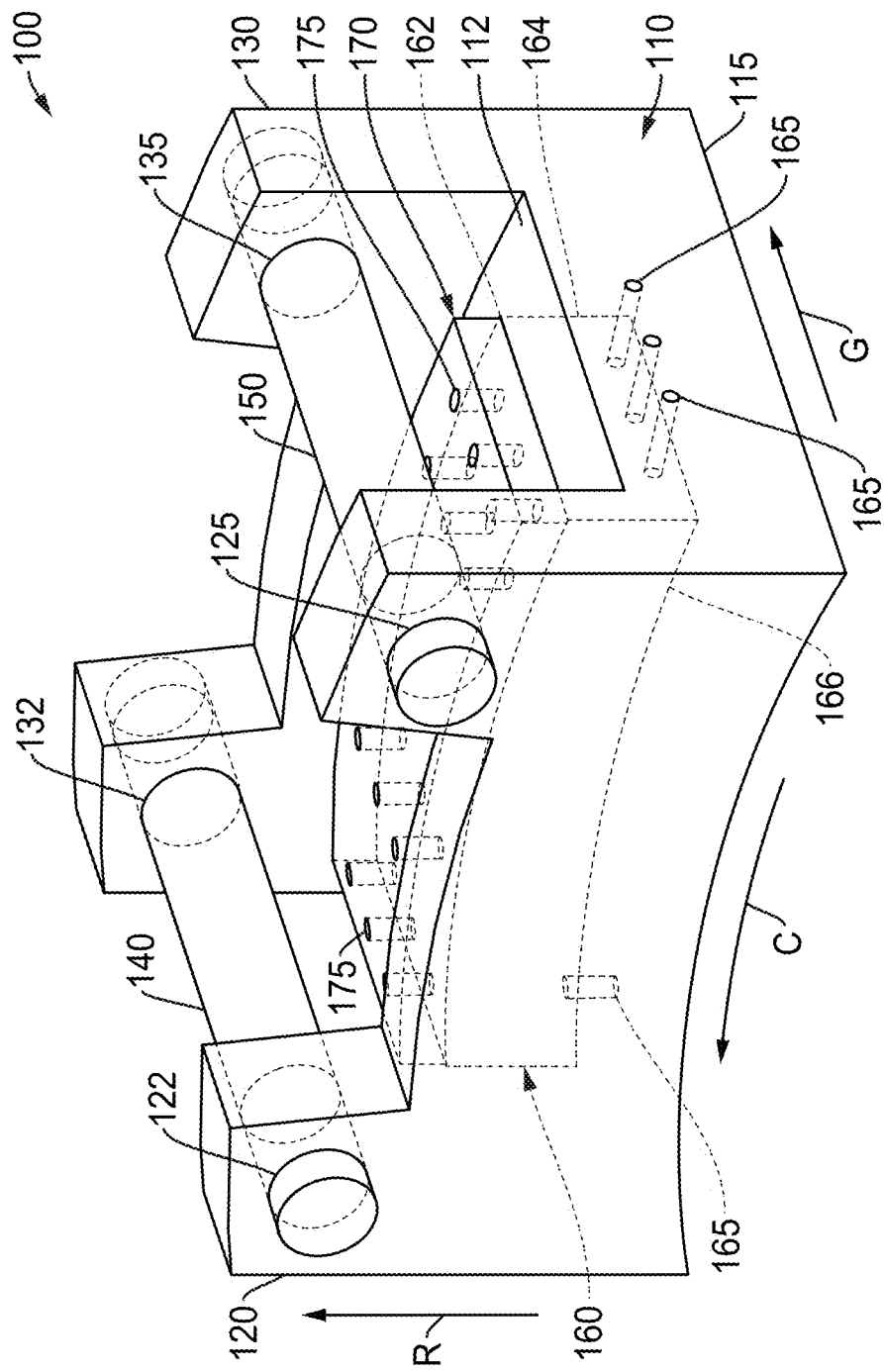
FIG. 2 is a perspective view of a blade outer air seal (BOAS) segment.

FIG. 2 illustrates a CMC component, specifically a blade outer air seal (BOAS) segment 100. In this figure, direction R indicates the radial direction, direction G indicates the axial direction or the direction of flow of hot gases through an engine, and direction C indicates a circumferential direction. The segment 100 includes a base 110 having a radial outer surface 112 and a radial inner surface 115. As shown in this embodiment, the radial outer surface 112 has a convex shape and the radial inner surface 115 has a concave shape. Segment 100 further includes a forward flange structure 120 and an aft flange structure 130. These two flange structures each extend from the radial outer surface 112 of the base 110. These flange structures are load bearing features and provide means for attaching the CMC component to another structure, for example, the outer casing of an engine. The base 110 and flange structures 120, 130 are made of a CMC material comprising a plurality of ceramic fiber plies and a ceramic matrix.

The flange structures are provided with openings to permit the attachment of retention/supporting hardware. As shown in FIG. 2, the forward flange structure 120 has a first opening 122 and a second opening 125. The aft flange structure 130 also has a first opening 132 and a second opening 135. Also shown in FIG. 2 are attachment pins 140 and 150. The first attachment pin 140 passes through the first opening 122 of the forward flange structure 120 and the first opening 132 of the aft flange structure 130. The second attachment pin 150 passes through the second opening 125 of the forward flange structure 120 and the second opening 135 of the second flange structure 130.

The base 110 is also provided with a cooling cavity 160. The cooling cavity 160 extends from the outer radial surface 112 of the base 110 into an interior region of the base 110 and has a cavity opening 162 at the outer radial surface of the base. The cooling cavity 160 is defined by cavity side walls 164 and a cavity bottom wall 166. Additionally, the cooling cavity 160 can be provided with one or more cooling air outlets 165 to provide for the discharge of cooling air from the cooling cavity, for example, discharge though a side wall of base 110 or through the radial inner surface 115. The cooling cavity 160 can optionally be covered by a cover plate or impingement plate 170 in which or more cooling holes 175 are provided to allow cooling air to enter the cooling cavity 160.

The cooling cavity 160 can be formed in the base prior to densification of the CMC preform by precutting the fiber plies that are to be laid up to form the preform with a cavity or by cutting (machining) the cavity into the preform once the plies are laid up. Alternatively, the cooling cavity can be created by machining after an initial pre-densification, such as by chemical vapor infiltration (CVI), or after final densification.

Figure 3:
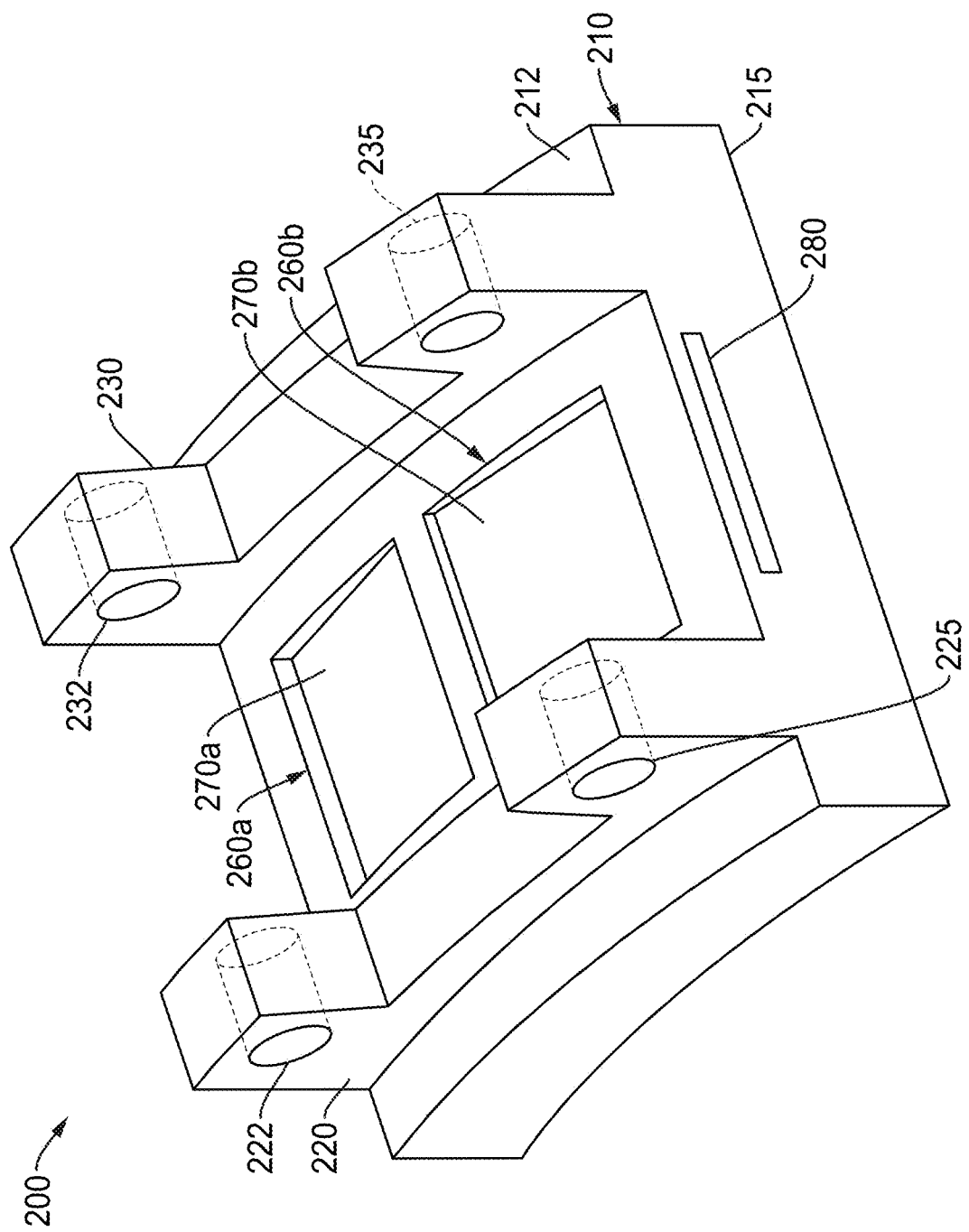
FIG. 3 is a perspective view of an embodiment of a BOAS segment with angled cover plate(s).

FIG. 3 shows an embodiment of a BOAS segment 200 having cover plate(s) in accordance with the present disclosure. Segment 200 includes a base 210 having a radial outer surface 212, a radial inner surface inward surface 215, a forward flange structure 220 and an aft flange structure 230. The forward flange structure 220 can have a first opening 222 and a second opening 225 for accommodating an attachment pin. Similarly, the aft flange structure 230 can also have a first opening 232 and a second opening 235 for accommodating an attachment pin. In this embodiment, the base 210 is also provided with two cooling cavities 260a and 260b. Positioned within the cooling cavities 260a and 260b are cover plates 270a and 270b, respectively. These cover plates are angled in the circumferential direction, one angled downwards towards one side of the segment 200 and the other angled downwards towards another side of segment 200. Also shown is a slot 280 in a side wall of base 210 which permits insertion of cover plate 270b into cooling cavity 260b. A similar slot in the other side wall of base 210 for assertion cover plate 270a is not shown.

Figure 4:
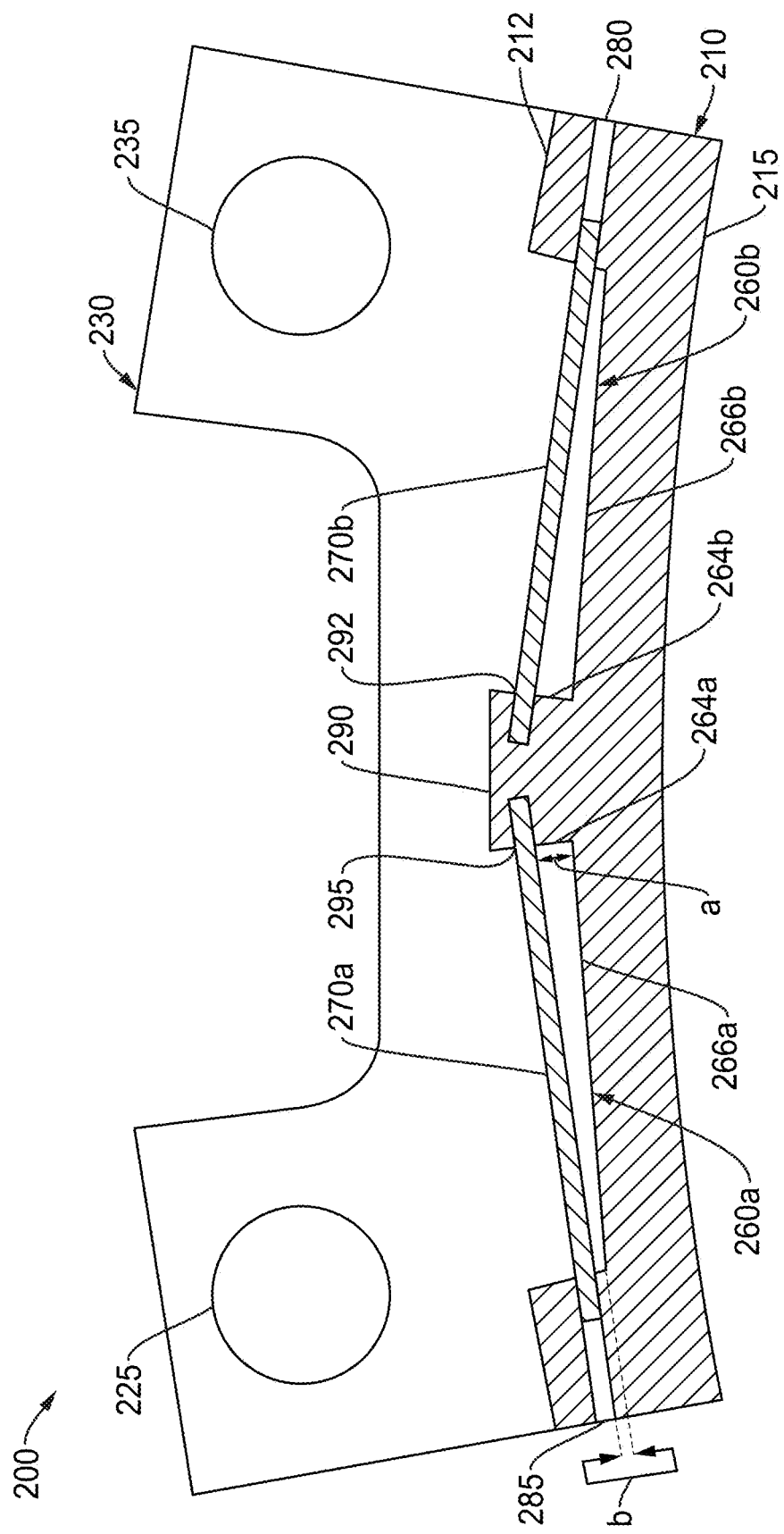
FIG. 4 is a cross sectional view of an embodiment of a BOAS segment with angled cover plate(s).

FIG. 4 shows a cross section of the BOAS segment 200 in the circumferential direction. As shown in FIG. 4, cooling cavities 260a and 260b are separated from each by a dividing wall 290. Each of cooling cavities 260a and 260b are defined by sidewalls 264a, 264b and a cooling cavity bottom wall 266a, 266b. Cover plates 270a and 270b are positioned within cooling cavities 260a and 260b, respectively, at an angle, and a flat inner surface facing the cavity bottom wall. As a result of the angling of the cover plates, the depth from the bottom surface of each cover plate to the respective cooling cavity bottom wall varies. In this embodiment, the cover plates 270a and 270b are angle such that the depth beneath each cover plate is greatest near dividing wall 290, i.e., depth "a" is greater than depth "b". For example, at a first edge of cover plate 270a and 270b, e.g., the edge greatest near dividing wall 290, the depth between the cover plate and the cavity bottom wall is 1.5 to 5 times (such as 1.5 to 4 times or 2 to 3.5 times or 1.5 to 2 times) greater than the depth between the cover plate and the cavity bottom wall at a second edge of the plate, e.g., the edge adjacent a side wall of base 210.

Cover plates 270a and 270b are inserted through slots 285, 280 in side walls of the base 210. Additionally, edges of the cover plates 270a and 270b are received within slots in the side walls 264a, 264b of the cooling cavities 260a and 260b. See, for example, slots 292 and 295.

By angling the cover plates 270a and 270b, and thereby varying the depth of the cooling cavities beneath the cover plates, the flux and velocity of cooling air within each cavity can be varied. As a result, the overall cooling ability of the cooling air flow can be modified and controlled. For example, cooling hole can be provided in each of the cover plates near dividing wall 290, i.e., at depth "a", to allow the egress of cooling air into the cooling cavities, and cooling air outlets can be provided near depth "b" to allow for the discharge of cooling air into the cooling cavities.

Figure 5:
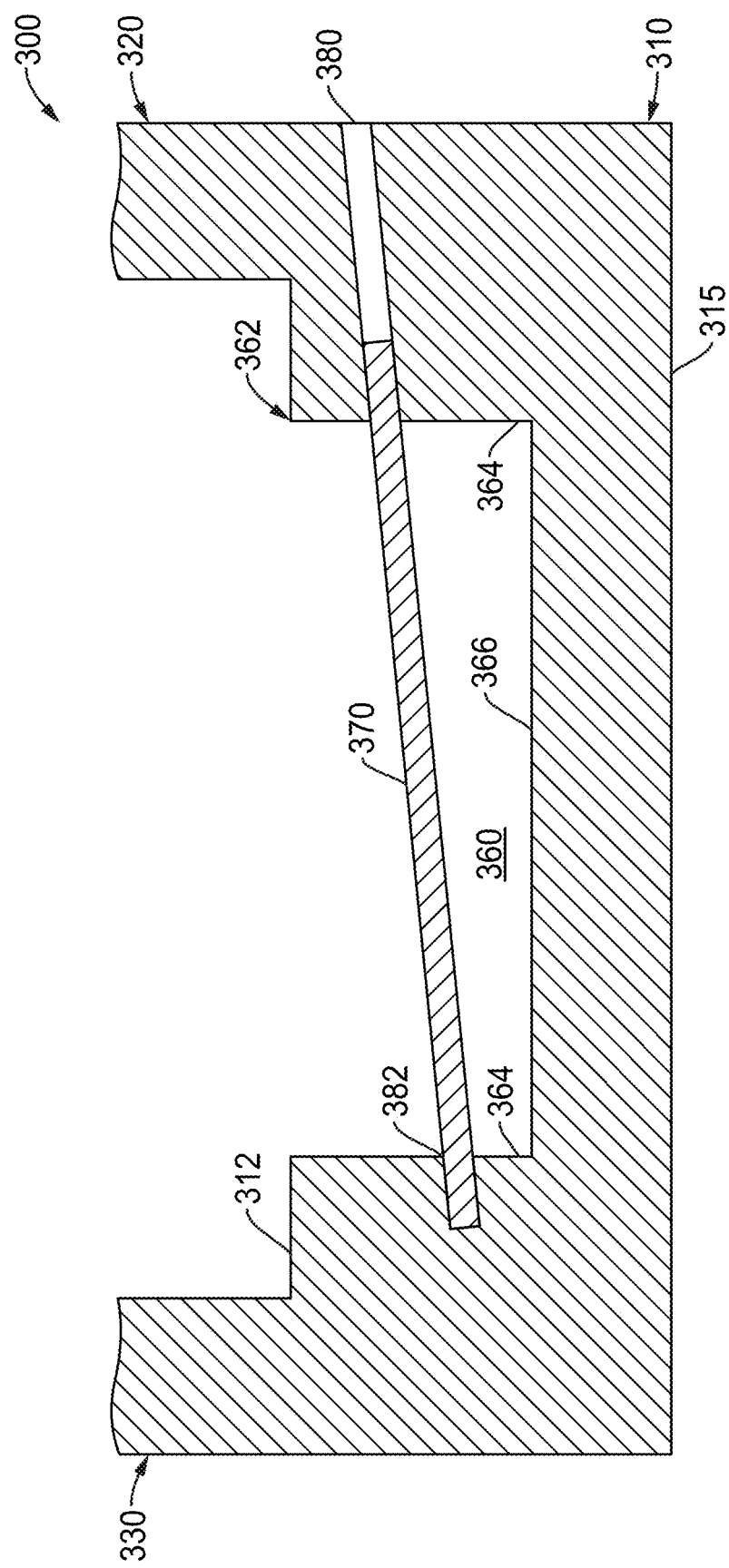
FIG. 5 is a cross sectional view of another embodiment of a BOAS segment with angled cover plate(s).

FIG. 5 shows a cross section of BOAS segment 300 having cover plates angled in an axial direction, rather than the circumferential direction. The BOAS segment includes base 310 having a radial outer surface 312 and a radial inner surface inward surface 315. The segment 300 further includes a forward flange structure 320 and an aft flange structure 330 extending from the radial outer surface of the base. The base 310 has a cooling cavity 360 with a cavity opening 362. The cavity is defined by defined by sidewalls 364 and a cooling cavity bottom wall 366. Cover plate 370 is positioned within cooling cavities 360 at an angle varying the depth of cooling cavity beneath the cover plate. Also shown is a slot 380 in forward flange structure 320 which permits insertion of cover plate 370. The aft edge of cover plate 370 is inserted into a further slot in aft flange structure 330 such that cover plate 370 is supported above cooling cavity bottom wall 366. In this embodiment, cover plates 370 is angled such that the depth beneath the cover plate is highest adjacent the forward flange structure 320 and varies axially such that the depth beneath the cover plate is the lowest adjacent the aft flange structure 330. As described above. the depth between the cover plate and the cavity bottom wall at one edge of the cover plate is 1.5 to 5 times (such as 1.5 to 4 times or 2 to 3.5 times or 1.5 to 2 times) greater than the depth between the cover plate and the cavity bottom wall at a second edge of the cover plate.

The present disclosure provides an efficient method for directing cooling air within cooling cavities in the interior of CMC components and the utilization of the cooling capability of the cooling air flow. The angled cooling plate can be used to vary the flux and/or velocity of cooling air within the cooling cavity and thereby achieve a desired cooling performance within the cooling cavity. By controlling the cooling flow within cooling cavities one can increase the efficiency of the utilization of the cooling air.

While the present disclosure has been particularly described, in conjunction with specific preferred embodiments, it is evident that many alternatives, modifications and variations will be apparent to those skilled in the art in light of the foregoing description. It is therefore contemplated that the appended claims will embrace any such alternatives, modifications and variations as falling within the true scope and spirit of the present disclosure.

What is claimed is:

1. A ceramic matrix composite (CMC) component comprising:
   a base having a radial outer surface and a radial inner surface inward surface, the base comprising a plurality of ceramic fiber plies and a ceramic matrix, the radial outer surface having a convex shape,
   at least one cooling cavity within the base that extends from the outer radial surface of the base into an interior region of the base, the at least one cooling cavity having a cavity opening at the outer radial surface of the base, and the at least one cooling cavity being defined by cavity side walls and a cavity bottom wall, and a cover plate positioned within the at least one cooling cavity to cover the cavity opening, wherein the cover plate is angled to vary the depth of the cooling cavity between the cover plate and the cavity bottom wall so that the depth varies from a cavity region of greater depth to a cavity region of lesser depth.

2. The CMC component according to claim 1, wherein the cover plate has a flat inner surface facing the cavity bottom wall.

3. The CMC component according to claim 1, wherein the component has two of the cooling cavities within the base, wherein each of the cavity openings is covered by a cover plate, and each cover plate is angled to vary the depth of the cooling cavity between the cover plate and the cavity bottom wall.

4. The CMC component according to claim 1, wherein the cover plate has at least one cooling air inlet and the base further including at least one cooling air outlet channel that provides fluid communication between the interior of the at least cooling cavity beneath the cover plate and the exterior of the CMC component.

5. The CMC component according to claim 4, wherein the at least one cooling air inlet is in fluid communication with the cavity region of greater depth and the at least one cooling air outlet channel is in fluid communication with the cavity region of lesser depth.

6. The CMC component according to claim 4, wherein the at least one cooling air inlet is in fluid communication with the cavity region of lesser depth and the at least one cooling air outlet channel is in fluid communication with the cavity region of greater depth.

7. The CMC component according to claim 1, wherein the cover plate is angled such that at a first edge of the cover plate the depth between the cover plate and the cavity bottom wall is 1.5 to 5 times greater than the depth between the cover plate and the cavity bottom wall at a second edge of the plate.

8. The CMC component according to claim 1, wherein the base has a forward edge, an aft edge, a first side edge and a second side edge, the forward edge and aft edge being spaced from one another in an axial direction, the first side edge and a second side edge being spaced from one another in a circumferential direction, and wherein the depth between the cover plate and the cavity bottom wall varies in a circumferential direction.

9. The CMC component according to claim 1, wherein the base has a forward edge, an aft edge, a first side edge and a second side edge, the forward edge and aft edge being spaced from one another in an axial direction, the first side edge and a second side edge being spaced from one another in a circumferential direction, and wherein the depth between the cover plate and the cavity bottom wall varies in an axial direction.

10. The CMC component according to claim 1, wherein the cover plate has edges that are positioned with the cavity side walls.

11. The CMC component according to claim 1, wherein the component is a combustor liner.

12. The CMC component according to claim 1, wherein the component is a blade outer air seal (BOAS) segment.

13. A BOAS assembly comprising a plurality of BOAS segments according claim 12, wherein the BOAS segments are arranged to form an annular shaped structure.

14. A method of controlling cooling air flow within a CMC component, the method comprising:
providing a CMC component comprising:
a base having a radial outer surface and a radial inner surface inward surface, the base comprising a plurality of ceramic fiber plies and a ceramic matrix, the radial outer surface having a convex shape, and
at least one cooling cavity within the base that extends from the outer radial surface of the base into an interior region of the base, the at least one cooling cavity having a cavity opening at the outer radial surface of the base, and the at least one cooling cavity being defined by cavity side walls and a cavity bottom wall, and
positioning a cover plate within the at least one cooling cavity to cover the cavity opening, wherein the cover plate is angled to vary the depth of the cooling cavity between the cover plate and the cavity bottom wall so that the depth varies from a cavity region of greater depth to a cavity region of lesser depth.

15. The method according to claim 14, wherein the cover plate has a flat inner surface facing the cavity bottom wall.

16. The method according to claim 14, wherein the component has two of the cooling cavities within the base, wherein each of the cavity openings is covered by a cover plate, and each cover plate is angled to vary the depth of the cooling cavity between the cover plate and the cavity bottom wall.

17. The method according to claim 1, wherein the cover plate has at least one cooling air inlet and the base further including at least one cooling air outlet channel that provides fluid communication between the interior of the at least cooling cavity beneath the cover plate and the exterior of the CMC component, and
(a) the at least one cooling air inlet is in fluid communication with the cavity region of greater depth and the at least one cooling air outlet channel is in fluid communication with the cavity region of lesser depth, or
(b) the at least one cooling air inlet is in fluid communication with the cavity region of lesser depth and the at least one cooling air outlet channel is in fluid communication with the cavity region of greater depth.

18. The method according to claim 14, wherein the cover plate is angled such that at a first edge of the cover plate the depth between the cover plate and the cavity bottom wall is 1.5 to 5 times greater than the depth between the cover plate and the cavity bottom wall at a second edge of the plate.

19. The method according to claim 14, wherein the cover plate has edges and the cover plate is position within the at least one cooling cavity such that the cover plate edges are positioned with the cavity side walls.

20. A turbine engine comprising:
a fan section, a compressor section, a combustion chamber, and a turbine section, the turbine section including at least one rotor and one or more turbine blade(s) extending radially outwardly from the at least one rotor; and
a blade outer air seal assembly positioned between the one or more turbine blade(s) and an outer casing to the engine;
wherein the blade outer air seal assembly is formed of a plurality blade outer air seal segments, wherein each blade outer air seal segment comprises:
a base having a radial outer surface and a radial inner surface inward surface, the base comprising a plurality of ceramic fiber plies and a ceramic matrix, the radial outer surface having a convex shape, at least one cooling cavity within the base that extends from the outer radial surface of the base into an interior region of the base, the at least one cooling cavity having a cavity opening at the outer radial surface of the base, and the at least one cooling cavity being defined by cavity side walls and a cavity bottom wall, and a cover plate positioned within the at least one cooling cavity to cover the cavity opening, wherein the cover plate is angled to vary the depth of the cooling cavity between the cover plate and the cavity bottom wall so that the depth varies from a cavity region of greater depth to a cavity region of lesser depth.

* * * * *